United States Patent
Srebranig et al.

(10) Patent No.: US 8,856,597 B2
(45) Date of Patent: Oct. 7, 2014

(54) VALIDATION OF A SYSTEM USING A DESIGN OF EXPERIMENTS PROCESSING TECHNIQUE

(75) Inventors: Steven Srebranig, Johnsburg, IL (US); Paul A. Anderson, Cary, IL (US)

(73) Assignee: STMicroelectronics, Inc., Coppell, TX (US)

( * ) Notice: Subject to any disclaimer, the term of this patent is extended or adjusted under 35 U.S.C. 154(b) by 245 days.

(21) Appl. No.: 13/479,531

(22) Filed: May 24, 2012

(65) Prior Publication Data

US 2013/0318399 A1 Nov. 28, 2013

(51) Int. Cl.
*G06F 11/00* (2006.01)

(52) U.S. Cl.
USPC .......................................................... 714/37

(58) Field of Classification Search
CPC .............. G06F 11/302; G06F 11/3604; G06F 11/3644; G06F 11/368; G06F 11/3688; G06F 11/3692
USPC .................................................... 714/37, 45
See application file for complete search history.

(56) References Cited

U.S. PATENT DOCUMENTS

| | | | |
|---|---|---|---|
| 6,604,092 B1 * | 8/2003 | Stewart | 706/47 |
| 7,050,950 B2 | 5/2006 | Goebel | |
| 2002/0066077 A1 * | 5/2002 | Leung | 717/126 |
| 2003/0093250 A1 * | 5/2003 | Goebel | 703/2 |
| 2004/0193959 A1 | 9/2004 | Simkins | |
| 2005/0283664 A1 * | 12/2005 | Coulter et al. | 714/15 |
| 2007/0043622 A1 * | 2/2007 | Olsen et al. | 705/22 |
| 2011/0295542 A1 * | 12/2011 | Rometsch | 702/108 |

FOREIGN PATENT DOCUMENTS

WO WO-0190897 A2 11/2001

OTHER PUBLICATIONS

EPO Search Report for EP 13168794.9 mailed Aug. 28, 2013 (9 pages).
Beizer: "Software Testing Techniques 2 Edition," 1990, XP002711319, pp. 23-24.

* cited by examiner

*Primary Examiner* — Joshua Lohn
(74) *Attorney, Agent, or Firm* — Gardere Wynne Sewell LLP

(57) ABSTRACT

A validation system includes a test block that operates to apply a set of inputs to a system under test, such as a test system or an executable test algorithm, and receive from said system under test a first set of outputs produced by operation of the system under test in response to application of the set of inputs. The first set of outputs, as well as a second set of outputs reflecting output produced by operation of a reference system or executable reference algorithm in response to application of the same set of inputs, is processed to make a validation determination. A validation processing block compares the first and second sets of outputs to validate the system under test as an equivalent to the reference system.

25 Claims, 4 Drawing Sheets

US 8,856,597 B2

VALIDATION OF A SYSTEM USING A DESIGN OF EXPERIMENTS PROCESSING TECHNIQUE

TECHNICAL FIELD

The present invention relates to a system (such as a System on Chip (SoC)) which executes an algorithm and, in particular, to a method and apparatus for validating a new version of that algorithm on the system using a Design of Experiments (DoE) processing technique.

BACKGROUND

Those skilled in the art understand that a System on Chip (SoC) combines the components of a complex computing or electronic system on a single integrated circuit. The included components of the system comprise both hardware components and software components. Hardware components include: timers, power supplies and regulators, input/output interfaces (analog and digital), microprocessors (or microcontrollers) and volatile/non-volatile memories. Software components include: an operating system, applications and drivers. A block diagram of an exemplary SoC 10 is provided in FIG. 1.

It is common, over the course of the operating life of an SoC, for an update of the SoC software components to occur. A new version of an algorithm may be provided to replace an existing version of the algorithm. Such a new version may fix problems with the existing version (such as "bugs"), present a more efficient implementation of functionality supported by the existing version, or add new functionality to that provided by the existing version. Validation of the new version of the algorithm is important to ensure that the new version can be used in place of the existing version without adversely affecting operation of the SoC. If validation is confirmed, the existing version may be deleted and the new version thereafter executed in its place.

SUMMARY

The present invention is directed to method and apparatus for validating a new version of an algorithm in regard to an existing or reference algorithm. A comparison of the algorithms is performed by executing both algorithms, modifying predetermined inputs to both algorithms and comparing the resulting outputs. Proper configuration of the inputs will allow, using the method of Design of Experiments (DoE), the determination of whether the differences in output are due to significant functional differences between the subject algorithms. The result of the comparison process leads to a determination of whether the new algorithm is basically the same as the existing or reference algorithm, and may further lead to a characterization of the new version as better or worse performing than the existing or reference algorithm.

The present invention is also directed to method and apparatus for validating a new system in regard to an existing or reference system. A comparison of the systems is performed by operating both systems, modifying predetermined inputs to both systems and comparing the resulting outputs. Proper configuration of the inputs will allow, using the method of Design of Experiments (DoE), the determination of whether the differences in output are due to significant functional differences between the subject systems. The result of the comparison process leads to a determination of whether the new system is basically the same as the existing or reference system, and may further lead to a characterization of the new system as better or worse performing than the existing or reference system.

In an embodiment, a system comprises: software components including a reference algorithm; hardware components including a processing component operable to execute the reference algorithm; and a validation system configured to test execution of a test algorithm in comparison to execution of said reference algorithm and in response thereto validate the test algorithm to replace said reference algorithm for execution by said processing component.

In an embodiment, a system comprises: software components including a test algorithm; hardware components including a processing component operable to execute the test algorithm; and a built-in-self-test system configured to test execution of the test algorithm in comparison to execution of a reference algorithm and in response thereto validate that execution of test algorithm by said processing component conforms with execution of said reference algorithm.

In an embodiment, a method comprises: accessing a reference algorithm; executing the accessed reference algorithm in response to a set of inputs to produce a first set of outputs; accessing a test algorithm; executing the accessed test algorithm in response to the same set of inputs to produce a second set of outputs; and comparing the first and second sets of outputs to validate the test algorithm as an equivalent to the reference algorithm.

In an embodiment, a validation system comprises: a test block configured to apply a set of inputs to a system under test and receive from said system under test a first set of outputs produced by operation of the system under test in response to application of the set of inputs; a memory storing the first set of outputs and further storing a second set of outputs, said second set of outputs reflecting output produced by operation of a reference system in response to application of the same set of inputs; and a validation processing block configured to compare the first and second sets of outputs to validate the system under test as an equivalent to the reference system.

In an embodiment, a method comprises: applying a set of inputs to a system under test; receiving from said system under test a first set of outputs produced by operation of the system under test in response to application of the set of inputs; storing the first set of outputs; storing a second set of outputs, said second set of outputs reflecting output produced by operation of a reference system in response to application of the same set of inputs; and comparing the first and second sets of outputs to validate the system under test as an equivalent to the reference system.

BRIEF DESCRIPTION OF THE DRAWINGS

For a better understanding of the embodiments, reference will now be made by way of example only to the accompanying figures in which.

DETAILED DESCRIPTION OF THE DRAWINGS

Updating of the software components of an SoC is a conventional activity. Here, the phrase "software components" is understood to mean and refer to any algorithmic-based process executed by the SoC including, without limitation, firmware, FPGA code, software, microcode, driver code, application code, operating system code, and the like.

Regression testing is an important element in the course of software component improvement and evolution. Regression testing is performed to give a level of assurance that already working systems are not compromised by any unanticipated adverse effects from planned innovative changes and fixes. Embodiments described herein focus on implementation of a method and system for a generic, relatively automated means of regression testing that can be made a ready attribute of a software system, and in particular the software system of an SoC. The method and system are further applicable to testing a software system of an SoC to ensure proper operation in a test mode, such as built-in-self-test (GIST) operation. The method and system are further applicable to testing an overall system in the context of making a replacement of a reference system with a new system.

Figure 1:
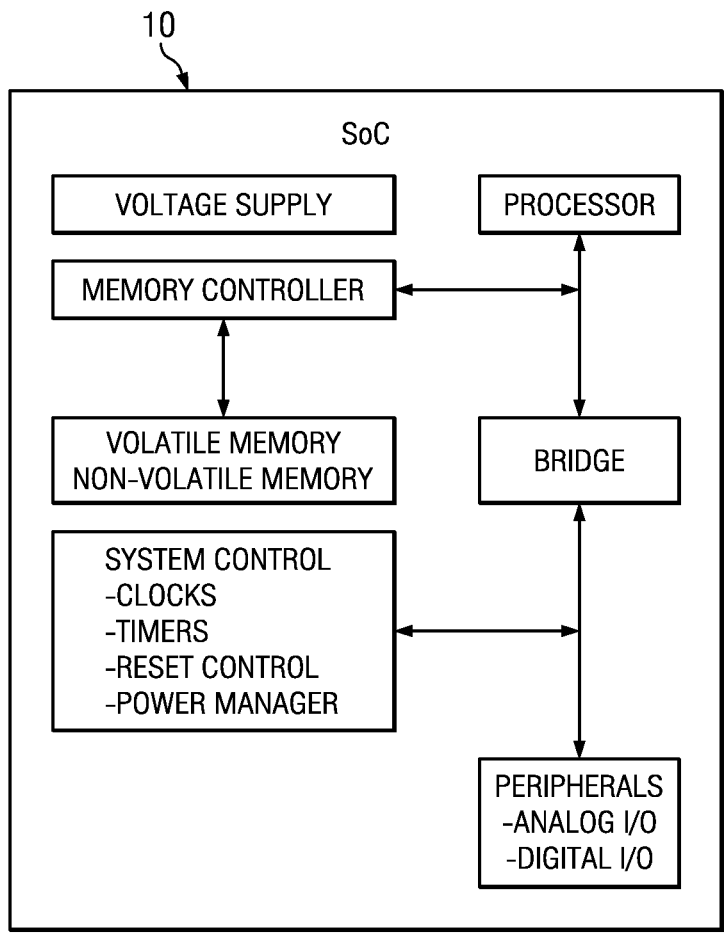
FIG. 1 is a block diagram of an exemplary SoC.
Figure 2:
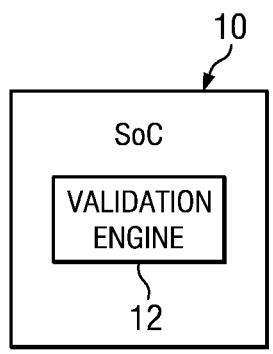
FIG. 2 illustrates the inclusion of a validation engine in an SoC.

Reference is now made to FIG. 2. An SoC 10, of the type shown in FIG. 1, is functionally enhanced over prior art SoC implementations to include an on-board validation engine 12. The validation engine 12 would typically be included in the firmware of the SoC 10. In an alternative implementation, the validation engine 12 is provided within the SoC 10 using a micro-controller device. In yet another implementation, the validation engine 12 is provided using a software driver of the SoC 10 that is specific to the validation purpose. The validation engine 12 may, for example, comprise a component of a BIST or other test mode function for the SoC 10.

In the scenario of an algorithm update, the validation engine 12 functions to implement a validation process which seeks to determine whether a new version (test) algorithm for an SoC software component can be used by the SoC in place of an existing (reference) algorithm. In the scenario of a test mode validation, the validation engine 12 functions to implement a validation process which seeks to determine whether the current version (test) algorithm is functioning properly in comparison to the functionality of a reference algorithm.

A number of input settings are provided in accordance with a Design of Experiments (DoE) methodology, and both the reference and test software components are executed in response to those input settings. Numerical output from each execution of the software components is collected and processed to tabulate means and variances. A table of DoE effects is generated from the tabulated means and variances as intervals to the desired level of confidence concerning whether the software component provided by the test algorithm can be used in place of, or operates equivalently to, a software component provided by the reference algorithm. A validation determination with respect to the test algorithm is made based on a selected confidence interval (CI). If the CI is approximately centered on zero, the validation determination is that there is no significant difference between the test algorithm and the reference algorithm (and thus the test algorithm can be used by the SoC in place of the reference algorithm). However, if the CI is not approximately centered on zero, the validation determination is there is a significant difference between the test algorithm and the reference algorithm (and thus the test algorithm cannot be used by the SoC in place of the reference algorithm). The CI value may be output as quantitative value indicative of the degree of difference between the test algorithm and the reference algorithm.

Figure 3:
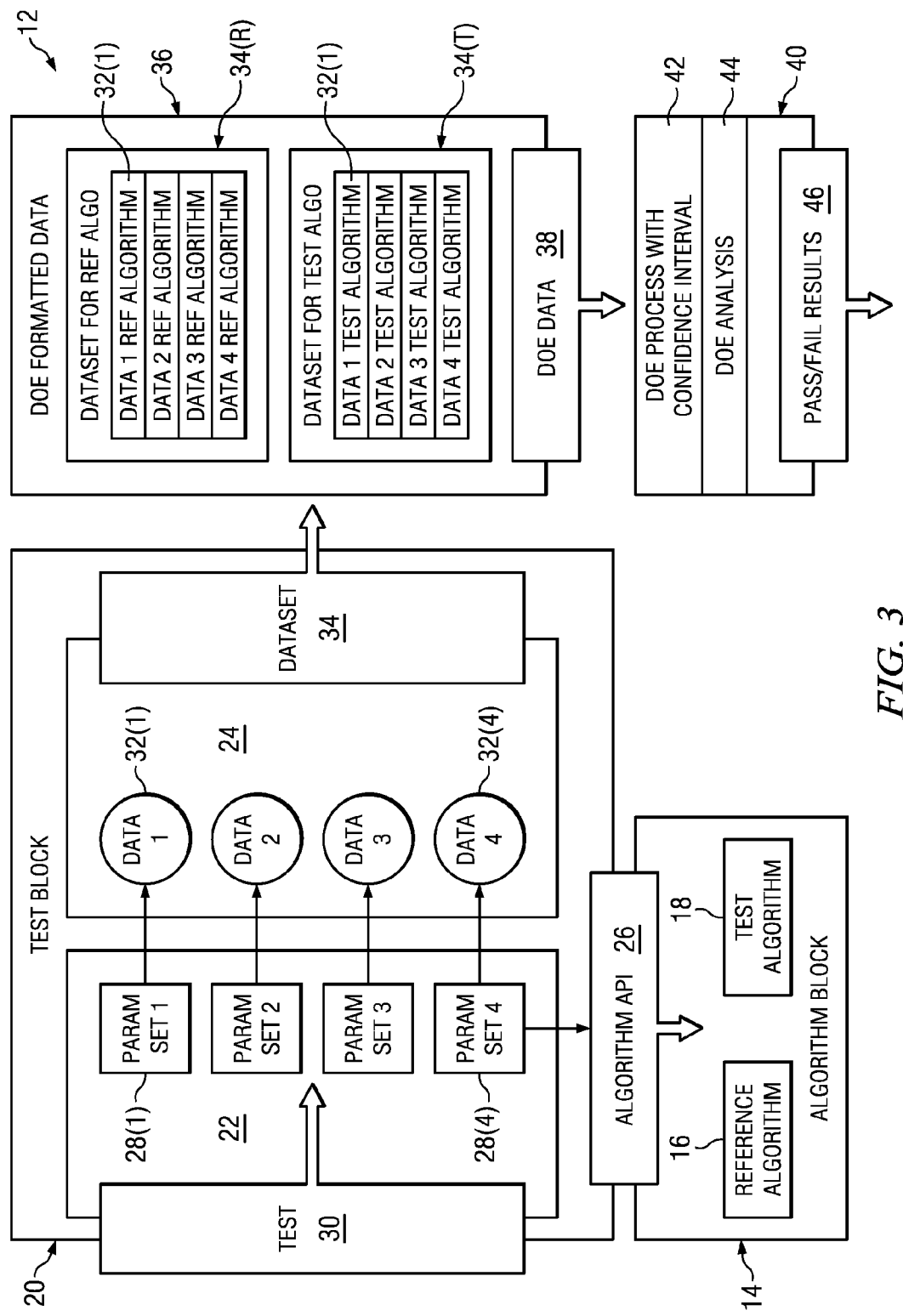
FIG. 3 is a functional block diagram of the validation engine of FIG. 2.

Reference is now made to FIG. 3 which illustrates a functional block diagram of the validation engine 12 of FIG. 2. The validation engine 12 is a wrapping control algorithm over two software components: the reference algorithm and the test algorithm.

The validation engine 12 includes an algorithm block 14. The algorithm block 14 stores both the reference algorithm 16 and the test algorithm 18. In another implementation, the testing of the reference algorithm 16 as described herein is a historical action completed in the past with the resulting test data stored, and thus the algorithm block 14 includes just the test algorithm 18.

The validation engine 12 further includes a test block 20. The test block 20 comprises an execution block 22 and an output block 24. The execution block 20 functions to execute an algorithm selected from the algorithm block 14 through algorithm application programming interface (API) 26. Execution of the selected algorithm comprises applying certain input data to the selected algorithm, having the selected algorithm process the input data, and further having the selected algorithm generate output data. The input data comprise certain reference Design of Experiments (DoE) treatments as a parameter set. A plurality of parameter sets 28(1)-28(M) are loaded through a test interface 30 into the execution block 22.

Figure 4:
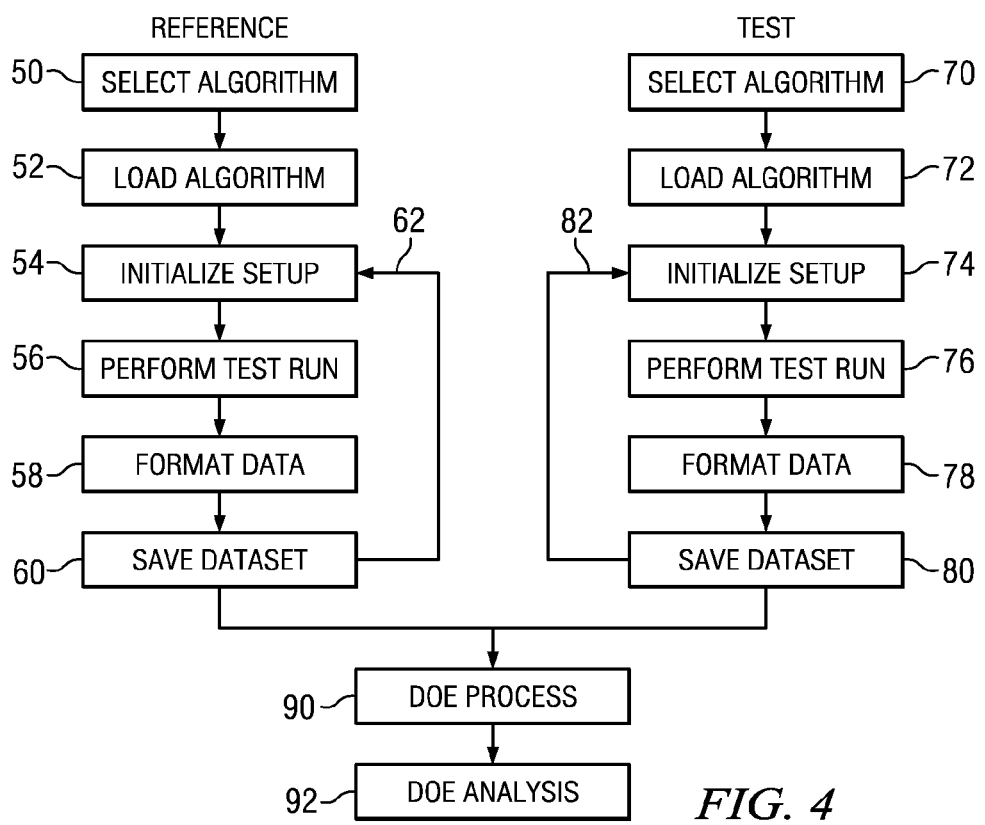
FIG. 4 is a flow diagram for validation engine operation in FIG. 3.

Reference is now made to FIG. 4 which illustrates a flow diagram for operation of the validation engine 12. The reference algorithm is selected in step 50 and loaded in step 52 for execution by the execution block 20. Setup is initialized in step 54 for a parameter set 28. The reference algorithm is then executed in step 56 with the parameter set from the step 54 initialization. Data output from the execution of the reference algorithm is then formatted in step 58 and saved in step 60. The steps 54-60 are then repeated 62 as required so that each parameter set 28 is evaluated and corresponding output data is collected.

Again, the testing of the reference algorithm may comprise a historical action completed in the past. The output data from such testing is formatted in step 58 and saved in step 60 for use in making a validation determination with respect to the test algorithm as will now be described.

Next, the test algorithm is selected in step 70 and loaded in step 72 for execution by the execution block 20. Setup is initialized in step 74 for a parameter set 28. The test algorithm is then executed in step 76 with the parameter set from the step 74 initialization. Data output from the execution of the test algorithm is then formatted in step 78 and saved in step 80. The steps 74-80 are then repeated 82 as required so that each parameter set 28 is evaluated and corresponding output data is collected.

It will be noted that the same plurality of parameter sets 28(1)-28(M) are used in the execution of the reference algorithm and in the execution of the test algorithm.

Reference is once again made to FIG. 3. The execution block 22 of the validation engine 12 includes input data storage for storing the plurality of parameter sets 28(1)-28(M). This input data storage need not be separate from the volatile/non-volatile memory of the SoC. The output block 24 of the validation engine 12 produces output data 32(1)-32(M), corresponding to execution of the parameter sets 28(1)-28(M) by the selected algorithm, and collects that data in a dataset 34 which contains all data generated by execution of the algorithm in response to the plurality of parameter sets 28(1)-28(M). Thus, there is a first output dataset 34(R) produced containing the output data resulting from execution of the reference algorithm. Again, the first output dataset 34(R) may comprise historical data. There is also a second output dataset 34(T) produced containing the output data resulting from execution of the test algorithm. The output datasets 34 are stored in a data store 36 as DoE formatted data 38. This output data store need not be separate from the volatile/non-volatile memory of the SoC.

In the event that each parameter set includes multiple samples for each parameter, the algorithm is executed on those samples and the output data 32 from execution by the execution block 22 will be tabulated by the execution block 22 to calculate mean and variance data which will comprise the output datasets 34.

Referring again to FIG. 4, after the output data has been collected from execution of the parameter sets by both the reference algorithm and the test algorithm, DoE processing is performed in step 90 and DoE analysis for making the validation decision is performed in step 92.

With reference once again to FIG. 3, the validation engine 12 still further includes a DoE processing block 40 which processes the DoE formatted data 38 and performs the operations of steps 90 and 92 of FIG. 4. The DoE processing block 40 functions to generate a table of DoE effects from the DoE formatted data 38 (for example, from the tabulated means and variances) as intervals to the desired level of confidence (reference 42; step 90 of FIG. 4). This table data is then processed by the DoE processing block 40 to make a validation decision (reference 44) based on a selected confidence interval (CI) (step 92 of FIG. 4). The validation results are provided at validation output 46. The validation output data may comprise, for example, pass/fail information for the test algorithm (i.e., "pass" if the test algorithm is can be used by the SoC in place of the reference algorithm, and "fail" if not). The validation output data in such an implementation may function as a control signal which drives SoC 10 acceptance of a proposed test algorithm. If the validation output 46 is "fail", the SoC 10 will continue to use the reference algorithm. However, the validation output 46 is "pass", the SoC 10 will replace the reference algorithm with the test algorithm.

The validation decision (reference 44) based on a selected confidence interval (CI) may comprise an evaluation as to whether the CI is approximately centered on zero, which would indicate that there is no significant difference between the test algorithm and the reference algorithm. Such a CI suggests that the test algorithm can be used by the SoC 10 in place of the reference algorithm. A CI other than approximately centered on zero, however, would indicate that there is a significant difference between the test algorithm and the reference algorithm. In such case, the test algorithm should not be used by the SoC 10 in place of the reference algorithm.

In an alternative implementation, the validation output 46 may comprise the CI value itself as a quantitative value indicative of the degree of difference between the test algorithm and the reference algorithm.

The validation engine 12 may be installed within the SoC 10 and function in test mode, such as a BIST mode, to evaluate test algorithm in comparison to stored (historical) DoE information relating to the reference algorithm. Such a test mode may be initiated at start-up of the SoC 10, or initiated on a periodic basis. If the test mode execution indicates a negative validation decision (reference 144), with a validation output 146 of "fail", the SoC 10 may be disabled from operation, or generate an error report, or be enabled for limited operation. However, if the validation output 146 is "pass", the SoC 10 will be enabled for full operation upon exit from test mode.

The processing performed by the validation engine 12 may be summarized as follows:
1) Generate output data from execution of the reference algorithm
   a. Initialize the system for execution of reference algorithm
      i. Set statistical significance level and other setup parameters and configurations
         1. Do N times:
            a. apply each input parameter set of the DoE
            b. generate reference algorithm output value
2) Generate output data from execution of the test algorithm
   a. Initialize the system for execution of test algorithm
      i. Set statistical significance level and other setup parameters and configurations
         1. Do N times:
            a. apply each input parameter set of the DoE
            b. generate test algorithm output value
3) Tabulate mean and variance of output based on N samples for each parameter of the parameter set
4) Generate a table of DoE effects
   a. As intervals to the desired level of confidence (e.g., 99%), using means and variances as generated
5) Generate validation: go/no-go based on the selected confident interval (CI)
   a. i.e., "Validation DoE fails to find significant difference" if the CI is approximately centered on zero, otherwise
   b. "Validation DoE finds significant difference"
      i. And yields the CI as a quantitative value of the difference A more specific summary of the configuration of and processing performed by the validation engine 12 is as follows:
1) The SoC device contains:
   a. Parameter set(s) stored in memory that are pre-configured with associated validation values
   b. Memory storage partitioned to store data
      i. Reference algorithm output data partition
         1. Mean and standard deviation for each DoE treatment pre-generated by a reference SoC for each applicable sub-system, using the same on-board Firmware Diagnostic Algorithm (FDA)
      ii. Test algorithm output data partition
      iii. Partition for validation report byte(s)/registers to identify DoE effect status
2) Initialize System
   a. Load mean and standard deviation of pre-generated reference algorithm DoE treatments
      i. These data are specific to a selected target sub-system for which the test algorithm is being evaluated
      ii. These are loaded as a default configuration of parameters
3) For each input parameter set of the selected target sub-system
   a. Generate output data values for the SoC processor from the FDA for each DoE treatment
   b. Update running mean and standard deviation in memory as part of the output data set
4) Using the reference algorithm and test algorithm means and standard deviations, generate a table of DoE effects
   a. Store the DoE effects as CI ranges in memory to a predetermined level of significance (e.g., 99%)
5) Generate validation result (for example, go/no-go) based on predetermined significance level from DoE effects
   a. e.g., "Validation DoE fails to find significant difference between test and reference algorithm" if the CI is approximately centered on zero, otherwise
   b. "Validation DoE finds significant difference"

6) Repeat starting at step 2 for another sub-system as required

With reference to FIG. 4, the steps 50-62 are performed in the above summarization in step 1 as an initialization operation. As an alternative, and as described above, the steps 50-62 for the reference algorithm may instead be performed in the context of evaluating the test algorithm.

Figure 5:
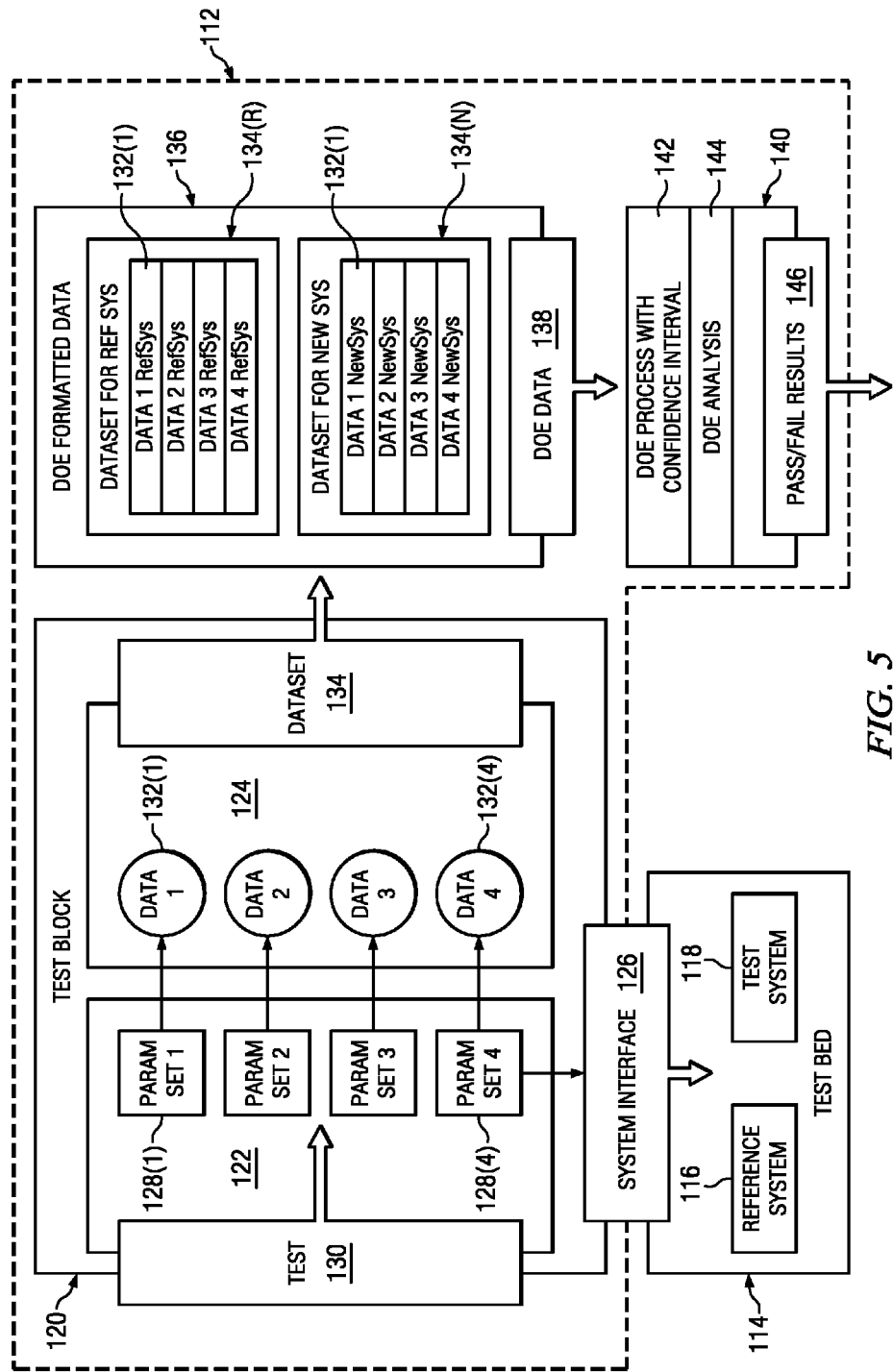
FIG. 5 is a functional block diagram of the validation engine operating with respect to the comparison of two systems.

Reference is now made to FIG. 5. There may occur instances when a given reference system is to be replaced by a new system, or where a new system must be evaluated in comparison to the reference system. In connection with such a system replacement or evaluation, a validation process may be performed by a validation engine 112 to ensure that the new system functions in a manner which is consistent with the reference system (with respect to common functionalities). A number of input settings are provided in accordance with a Design of Experiments (DoE) methodology, and both the reference and new systems are operated in response to those input settings. Numerical output from each operation of the systems is collected and processed to tabulate means and variances. A table of DoE effects is generated from the tabulated means and variances as intervals to the desired level of confidence concerning whether the new system can be used in place of the reference system. A validation determination with respect to the new system is made based on a selected confidence interval (CI). If the CI is approximately centered on zero, the validation determination is that there is no significant difference between the new system and the reference system (and thus the new system can be used in place of the reference system). However, if the CI is not approximately centered on zero, the validation determination is there is a significant difference between the new system and the reference system (and thus the new system cannot be used in place of the reference system). The CI value may be output as quantitative value indicative of the degree of difference between the new system and the reference system.

FIG. 5 illustrates a functional block diagram of the validation engine 112 acting on a test bed 114. In one implementation, the test bed includes both the reference system 116 and the new system 118. In another implementation, the testing of the reference system 116 as described herein is a historical action completed in the past with the resulting test data stored, and thus the test bed includes just the new system 118.

The validation engine 112 includes a test block 120. The test block 120 comprises an execution block 122 and an output block 124. The execution block 120 functions to operate a system selected from the test bed 114 through a system interface 126. Operation of the selected system comprises applying certain input data to the selected system, having the selected system process or operate on the input data, and further having the selected system generate output data. The input data comprise certain reference Design of Experiments (DoE) treatments as a parameter set. A plurality of parameter sets 128(1)-128(M) are loaded through a test interface 130 into the execution block 122.

Figure 6:
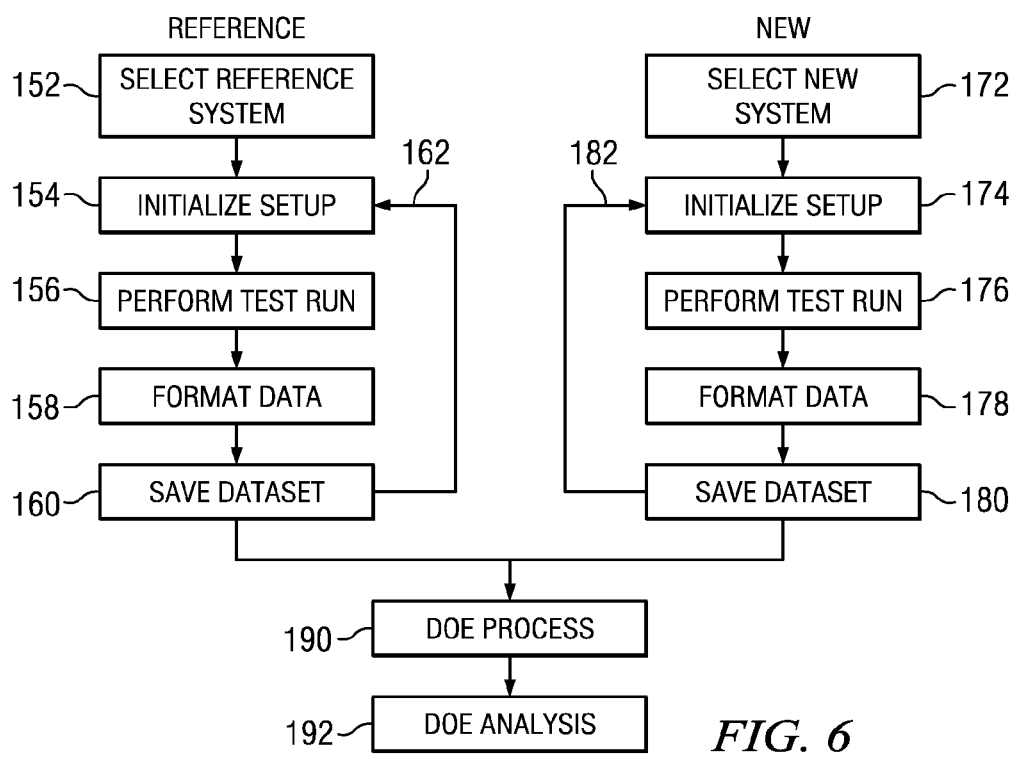
FIG. 6 is a flow diagram for validation engine operation in FIG. 5.

Reference is now made to FIG. 6 which illustrates a flow diagram for operation of the validation engine 112. The reference system is selected in step 152 for operation under the control of the execution block 120. Setup is initialized in step 154 for a parameter set 128. The reference system is then operated in step 156 with the parameter set from the step 154 initialization. Data output from the reference system in response to the test input is then formatted in step 158 and saved in step 160. The steps 154-160 are then repeated 162 as required so that each parameter set 128 is evaluated and corresponding output data is collected.

Again, the testing of the reference system may comprise a historical action completed in the past. The output data from such testing is formatted in step 158 and saved in step 160 for use in making a validation determination with respect to the new system as will now be described.

Next, the new system is selected in step 172 for operation under the control of the execution block 120. This selection could be made, for example, in connection with a test mode or built-in-self-test (GIST) functionality supported by the system. Setup is initialized in step 174 for a parameter set 128. The new system is then operated in step 176 with the parameter set from the step 174 initialization. Data output from the new system in response to the test input is then formatted in step 178 and saved in step 180. The steps 174-180 are then repeated 182 as required so that each parameter set 128 is evaluated and corresponding output data is collected.

It will be noted that the same plurality of parameter sets 128(1)-128(M) are used in the test operation of the existing (reference) system and in the test operation of the new system.

Reference is once again made to FIG. 5. The execution block 122 of the validation engine 112 includes input data storage for storing the plurality of parameter sets 128(1)-128(M). The output block 124 of the validation engine 112 produces output data 132(1)-132(M), corresponding to execution of the parameter sets 128(1)-128(M) by the selected system, and collects that data in a dataset 134 which contains all data generated by operation of the system in response to the plurality of parameter sets 128(1)-128(M). Thus, there is a first output dataset 134(R) produced containing the output data resulting from execution of the reference system. Again, the first output dataset 134(R) may comprise historical data. There is also a second output dataset 134(N) produced containing the output data resulting from execution of the new system. The output datasets 134 are stored in a data store 136 as DoE formatted data 138.

In the event that each parameter set includes multiple samples for each parameter, the systems are operated in response to those samples and the output data 132 from execution by the execution block 122 will be tabulated by the execution block 122 to calculate mean and variance data which will comprise the output datasets 134.

Referring again to FIG. 6, after the output data has been collected from operation of the system(s) in response to the parameter sets, DoE processing is performed in step 190 and DoE analysis for making the validation decision is performed in step 192.

With reference once again to FIG. 5, the validation engine 112 still further includes a DoE processing block 140 which processes the DoE formatted data 138 and performs the operations of steps 190 and 192 of FIG. 6. The DoE processing block 140 functions to generate a table of DoE effects from the DoE formatted data 138 (for example, from the tabulated means and variances) as intervals to the desired level of confidence (reference 142; step 190 of FIG. 6). This table data is then processed by the DoE processing block 140 to make a validation decision (reference 144) based on a selected confidence interval (CI) (step 192 of FIG. 6). The validation results are provided at validation output 146. The validation output data may comprise, for example, pass/fail information for the new system (i.e., "pass" if the operation of the new system is consistent with that of the reference system, and "fail" if not). The validation output data in such an implementation may function as a control signal which enables of the new system for operation outside of a test mode (i.e., enabled for normal operation). If the validation output 146 is "fail", the new system may be disabled from operation, or generate an error report, or be enabled for limited operation.

However, the validation output 146 is "pass", the new system will be enabled for full operation.

The validation decision (reference 144) based on a selected confidence interval (CI) may comprise an evaluation as to whether the CI is approximately centered on zero, which would indicate that there is no significant difference between the operation of the new system and the operation of the reference system. Such a CI suggests that the new system can be used in place of, or is functionally and operationally equivalent to, the reference system. A CI other than approximately centered on zero, however, would indicate that there is a significant difference between operation of the new system and the reference system. In such case, the new system should not be used in place of the reference system.

In an alternative implementation, the validation output 146 may comprise the CI value itself as a quantitative value indicative of the degree of difference between the new system and the reference system.

The validation engine 112 may, in an embodiment, be installed within the new system itself and function in test mode, such as a BIST mode, to evaluate new system operation in comparison to stored (historical) DoE information relating to the reference system. Such a test mode may be initiated at start-up of the system, or initiated on a periodic basis. If the test mode execution indicates a negative validation decision (reference 144), with a validation output 146 of "fail", the new system may be disabled from operation, or generate an error report, or be enabled for limited operation. However, if the validation output 146 is "pass", the new system will be enabled for full operation upon exit from test mode.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

What is claimed is:

1. A system, comprising:
software components including a reference algorithm;
hardware components including a processing component operable to execute the reference algorithm; and
a validation system configured to test execution of a test algorithm in comparison to execution of said reference algorithm by: applying a set of inputs selected in accordance with a Design of Experiments (DoE) methodology to execution by both the reference algorithm and test algorithm to produce a first set of outputs and a second set of outputs, respectively, and in response thereto validate the test algorithm to replace said reference algorithm for execution by said processing component by: tabulating means and variances of the first and second sets of outputs and generating a table of DoE effects from the tabulated means and variances as intervals to a desired level of confidence concerning equivalence in execution of the test algorithm and reference algorithm.

2. The system of claim 1, wherein said system comprises an integrated circuit System on Chip (SoC).

3. The system of claim 1, wherein said desired level of confidence concerning equivalence is indicative of whether the test algorithm is an acceptable replacement for the reference algorithm.

4. The system of claim 1, wherein said desired level of confidence concerning equivalence is indicative of whether the reference algorithm or test algorithm is better performing.

5. The system of claim 1, wherein said desired level of confidence concerning equivalence is indicative of whether the reference algorithm and test algorithm are functionally different.

6. The system of claim 1, wherein validation comprises determining validation of the test algorithm based on a confidence interval.

7. A system, comprising:
software components including a test algorithm;
hardware components including a processing component operable to execute the test algorithm; and
a built-in-self-test system configured to test execution of the test algorithm in comparison to execution of a reference algorithm by: applying a set of inputs selected in accordance with a Design of Experiments (DoE) methodology to execution by both the reference algorithm and test algorithm to produce a first set of outputs and a second set of outputs, respectively, and in response thereto validate that execution of test algorithm by said processing component conforms with execution of said reference algorithm by: tabulating means and variances of the first and second sets of outputs and generating a table of DoE effects from the tabulated means and variances as intervals to a desired level of confidence concerning equivalence in execution of the test algorithm and reference algorithm.

8. The system of claim 7, wherein said system comprises an integrated circuit System on Chip (SoC).

9. The system of claim 7, wherein said desired level of confidence concerning equivalence indicates whether the test algorithm performs in accordance with the reference algorithm.

10. The system of 9, wherein the validation system is further operable to generate an output in response to said validation enabling operation of the system with the test algorithm.

11. The system of claim 7, wherein validation comprises determining validation of the test algorithm based on a confidence interval.

12. A method, comprising:
accessing a reference algorithm;
executing the accessed reference algorithm in response to a set of inputs selected in accordance with a Design of Experiments (DoE) methodology to produce a first set of outputs;
accessing a test algorithm;
executing the accessed test algorithm in response to the same set of inputs to produce a second set of outputs; and
comparing the first and second sets of outputs to validate the test algorithm as an equivalent to the reference algorithm by:
tabulating means and variances of the first and second sets of outputs; and
generating a table of DoE effects from the tabulated means and variances as intervals to a desired level of confidence concerning equivalence in execution of the test algorithm and reference algorithm.

13. The method of claim 12, further comprising replacing the reference algorithm with the test algorithm for execution in a processing system in response to said comparison.

14. The method of claim 12, further comprising enabling operation of a processing system executing the test algorithm in response to said comparison.

15. The method of claim 12, wherein comparing further comprises: determining validation of the test algorithm based on a confidence interval.

16. The method of claim 12, wherein a result of said comparison provides an indication of whether the reference algorithm or test algorithm is better performing.

17. The method of claim 12, wherein a result of said comparison provides an indication of whether the reference algorithm and test algorithm are functionally different.

18. A validation system, comprising:
a test block configured to apply a set of inputs selected in accordance with a Design of Experiments (DoE) methodology to a system under test and receive from said system under test a first set of outputs produced by operation of the system under test in response to application of the set of inputs;
a memory storing the first set of outputs and further storing a second set of outputs, said second set of outputs reflecting output produced by operation of a reference system in response to application of the same set of inputs; and
a validation processing block configured to compare the first and second sets of outputs to validate the system under test as an equivalent to the reference system by:
tabulating means and variances of the first and second sets of outputs; and
generating a table of DoE effects from the tabulated means and variances as intervals to a desired level of confidence concerning equivalence in execution of the test algorithm and reference algorithm.

19. The validation system of claim 18, wherein the validation system is a built-in-self-test (BIST) system.

20. The validation system of claim 18, wherein the system under test comprises a test algorithm and operation the system under test comprises execution of the test algorithm in response to the set of inputs, and further wherein the reference system comprises a reference algorithm, said second set of outputs produced from execution of the reference algorithm in response to the set of inputs.

21. The validation system of claim 18, wherein the validation system is a component of a System on Chip (SoC).

22. The validation system of claim 18, wherein said validation processing block is further configured to determine validation of the system under test based on a confidence interval.

23. A method, comprising:
applying a set of inputs selected in accordance with a Design of Experiments (DoE) methodology to a system under test;
receiving from said system under test a first set of outputs produced by operation of the system under test in response to application of the set of inputs;
storing the first set of outputs;
storing a second set of outputs, said second set of outputs reflecting output produced by operation of a reference system in response to application of the same set of inputs; and
comparing the first and second sets of outputs to validate the system under test as an equivalent to the reference system by:
tabulating means and variances of the first and second sets of outputs; and
generating a table of DoE effects from the tabulated means and variances as intervals to a desired level of confidence concerning equivalence between the system under test and reference system.

24. The method of claim 23, wherein the system under test comprises a test algorithm and operation the system under test comprises executing the test algorithm in response to the set of inputs, and further wherein the reference system comprises a reference algorithm, said second set of outputs produced from execution of the reference algorithm in response to the set of inputs.

25. The method of claim 23, wherein the method further comprising: determining validation of the system under test based on a confidence interval.

\* \* \* \* \*